(12) United States Patent
Tung et al.

(10) Patent No.: US 7,080,973 B2
(45) Date of Patent: Jul. 25, 2006

(54) FAN SEAT AND METHOD FOR PRODUCING IT

(75) Inventors: Chao-Nien Tung, Tu-Cheng (TW); Xi-Jian Zhu, Shenzhen (CN)

(73) Assignee: HON HAI Precision Industry Co., Ltd., Tu-cheng (TW)

( * ) Notice: Subject to any disclaimer, the term of this patent is extended or adjusted under 35 U.S.C. 154(b) by 106 days.

(21) Appl. No.: 10/892,032

(22) Filed: Jul. 15, 2004

(65) Prior Publication Data
US 2005/0106031 A1 May 19, 2005

(30) Foreign Application Priority Data
Nov. 18, 2003 (TW) .............................. 92132248 A
Nov. 29, 2003 (CN) ......................... 2003 1 0112451

(51) Int. Cl.
F03B 11/06 (2006.01)
F03D 11/04 (2006.01)

(52) U.S. Cl. ................ 416/174; 416/244 R; 415/170.1; 415/229; 29/898.05

(58) Field of Classification Search ............ 416/244 R, 416/174; 415/170.1, 229, 220; 29/898.049, 29/898.05; 310/90, 91; 384/276, 295, 296, 384/297
See application file for complete search history.

(56) References Cited

U.S. PATENT DOCUMENTS

| 2,990,112 A | * | 6/1961 | Levy et al. ............. 416/170 R |
| 5,127,745 A | * | 7/1992 | Momose et al. ............ 384/276 |
| 5,610,462 A | * | 3/1997 | Takahashi .................... 310/90 |
| 6,137,197 A | * | 10/2000 | Taniguchi et al. ........ 310/67 R |
| RE37,261 E | * | 7/2001 | Schmider et al. ........ 417/423.7 |
| 6,612,814 B1 | * | 9/2003 | Shih et al. .................. 417/354 |

FOREIGN PATENT DOCUMENTS

TW 575089 2/2004

* cited by examiner

Primary Examiner—Igor Kershteyn
(74) Attorney, Agent, or Firm—Tim Tingkang Xia, Esq.; Morris, Manning & Martin

(57) ABSTRACT

A fan seat (30, 30') includes a basis (31) with a vertical extending tubal portion (32) having a pair of flanges (33) integrally formed on opposite ends of an inner circumferential surface thereof, and a bearing set (34, 34') located in the tubal portion and sandwiched between the flanges. The bearing set includes a tube (36) and a pair of bearings (38) firmly secured in opposite ends of the tube. A method for producing the fan seat includes the following steps: providing a mold (50) with a cavity (53), locating the bearing set in the cavity with a space (60) formed between the bearing set and the mold corresponding to the tubal portion, injecting molten material into the space, and cooling the molten material whereby the molten material congeals into the tubal portion and integrates with the tube.

15 Claims, 3 Drawing Sheets

FAN SEAT AND METHOD FOR PRODUCING IT

CROSS-REFERENCE TO RELATED PATENT APPLICATIONS

This application claims the benefit of Taiwan Patent Application Serial No. 092132248, filed Nov. 18, 2003, which status is pending, and Chinese Patent Application Serial No. 200310112461.6, filed Nov. 29, 2003, which status is also pending, the disclosures for which are hereby incorporated herein in their entirety by reference

TECHNICAL FIELD

The present invention relates to a fan seat and method for producing it, and particularly to a fan seat having bearings precisely coaxial with each other and method for producing it.

BACKGROUND

Currently, fans are usually used for heat dissipation of electronic devices. Oftentimes, a fan includes a blade set and a fan seat. The fan seat has a central tubal portion integrally formed thereon. A pair of bearings made of metal are arranged in the tubal portion. A coil is winded outside of the tubal portion. The blade set is formed with a cap and blades connected to the cap. A magnet pushed by magnetic force of the coil and a stainless steel rotary shaft supported by the pair of bearings are arranged within the cap. As the aforesaid coil generates a magnetic force, the magnet is pushed to cause the blades to operate and produce a wind with a wind pressure. Since the aforesaid stainless steel rotary shaft is arranged on the metal bearings to rotate, after rotating for a period of time, the rotary shaft and bearing will wear and, thus, the lifetime of the fan will be reduced. In order to improve the lifetime of the fan, wear-tolerable ceramic bearings have been developed.

Conventionally, ceramic bearings are installed to a tubal portion of a fan seat as mentioned above. FIGS. 5–6 show a mold 10 for producing a fan seat 20 comprising a tubal portion 22 and a pair of bearings 10 installed in the tubal portion 22. The mold 10 comprises an upper part 12 and a lower part 14. A space 18 having a profile corresponding to the tubal portion 22 and the fan seat 20 is formed between the upper part 12 and the lower part 14 of the mold 10. In producing, molten plastic is injected into the space 18 of the mold 10. After cooled, molten plastic congeals into the tubal portion 22 of the fan seat 20. The bearings 10 are then installed to opposite ends of the tubal portion 22 of the fan seat 20.

However, the tubal portion 22 is prone to deform in cooling process after taken out from the mold 10, which results in the radial size of the tubal portion 22 not consistent along an axial direction of the tubal portion 22. Thus, it is difficult to ensure the pair of bearings 10 precisely coaxial with each other. Friction force between the bearings 10 and the rotary shaft rotating therein is inevitably increased, which results in increasing noise of the fan and reduced lifetime of the fan.

SUMMARY

Accordingly, an object of the present invention is to provide a fan seat which have bearings precisely coaxial with each other and a method for producing it.

To achieve the above-mentioned object, a fan seat in accordance with the present invention comprises a basis with a vertical extending tubal portion having a pair of flanges integrally formed on opposite ends of an inner circumferential surface thereof, and a bearing set located in the tubal portion and sandwiched between the flanges. The method for producing the fan seat as mentioned above comprises the following steps: providing a mold with a cavity, locating the bearing set in the cavity with a space formed between the bearing set and the mold corresponding to the basis, injecting molten material into the space, and cooling the molten material whereby the molten material congeals into the tubal portion and integrates with the tube.

Other objects, advantages and novel features of the present invention will be drawn from the following detailed description of a preferred embodiment of the present invention with attached drawings, in which:

DETAILED DESCRIPTION OF PREFERRED EMBODIMENTS

Figure 1:
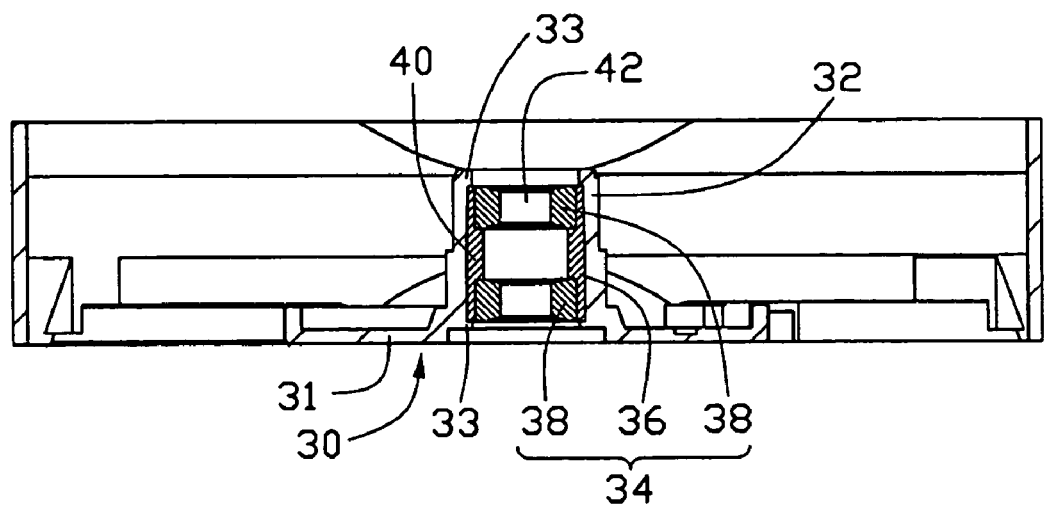
FIG. 1 is a cross section view of a fan seat in accordance with a preferred embodiment of the present invention.

Referring to FIG. 1, a fan seat 30 in accordance with a preferred embodiment of the present invention comprises a basis 31 with an upward-extending tubal portion 32 formed on a center thereof. The tubal portion 32 comprises a pair of flanges 33 formed on opposite ends of an inner circumferential surface thereof. The inner diameters of the flanges are smaller than that of the cylindricla portion 32. A bearing set 34 is installed in the tubal portion 32 and sandwiched between the pair of flanges 33. The bearing set 34 comprises a tube 36 and a pair of nano ceramic bearings 38 firmly secured in opposite ends of the tube 36. The tube 36 is made of metal material such as: copper. The tube 36 has a precision inner circumferential surface. An annular shoulder 40 is formed on a middle portion of the inner circumferential surface of the tube 36 for spacing the two bearings 38. The bearings 38 commonly define a pair of coaxial holes 42 for installation and extension of a rotary shaft (not shown).

Figure 2:
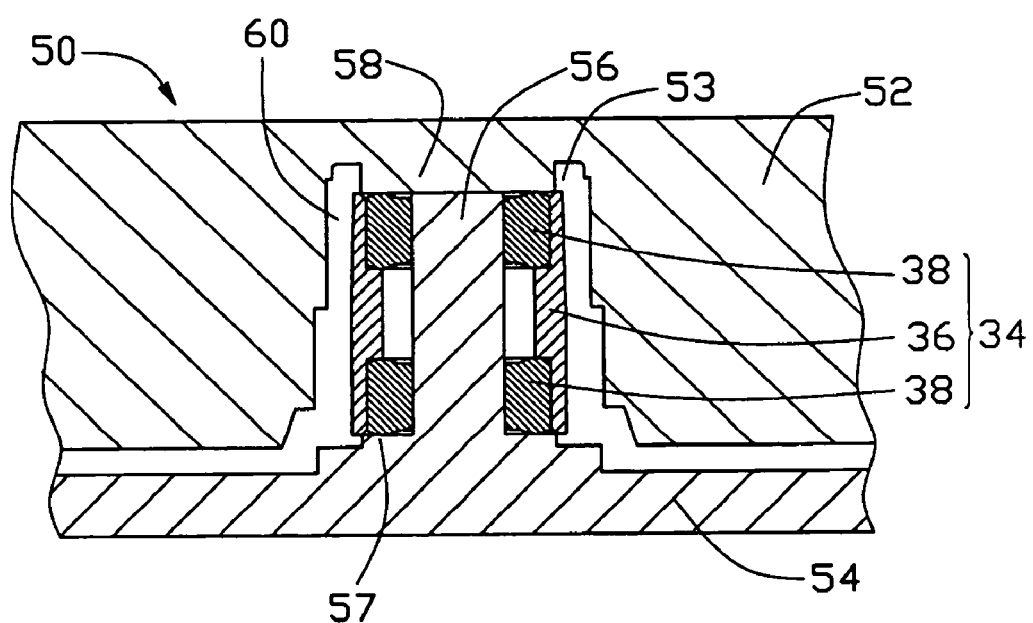
FIG. 2 is a cross section view of a part of a mold used in a method for producing the fan seat of FIG. 1, together with a bearing set of the fan seat of FIG. 1.

FIG. 2 shows a mold 50 for producing the basis 31 of the fan seat 30. The mold 50 comprises an upper part 52 and a lower part 54. A cavity 53 is defined in a central portion of the upper part 52. A stand 57 is formed on a central portion of the upper surface of the lower part 54. An outer diameter of the stand 57 is smaller than an outer diameter of the tube 36 so that the lower one of the flanges 33 can be formed to grip a bottom end of the tube 36. A post 56 extends upwardly from the stand 57. An outer diameter of the post 56 is substantially equal to inner diameters of the bearings 38. The post 56 has a precision outer circumferential surface to ensure the bearings 38 precisely coaxial with each other. A block 58 depends from a cetral portion of the upper part 52 and extends into the cavity 53. An outer diameter of the block 58 is smaller than the outer diameter of the tube 36 so that an upper one of the flanges 33 cab be formed to grip a top end of the tube 36.

In producing, the pair of bearings 38 is firmly secured in opposite ends of the tube 36 to form the bearing set 34. The bearing set 34 surrounds the post 56 which extends through the coaxial holes 42 of the bearings 38. The upper part 52 of the mold 50 is closed to the lower part 54 with the combined bearing set 34 and post 56 of the lower part 54 received in the cavity 53 of the upper part 52. The block 58 supportedly abuts against the post 56 and the upper bearing 38. A space 60 which has a profile corresponding to the basis 31 of the fan seat 30 is therefore formed between the upper part 52 and the lower part 54. Molten plastic is then injected into the space 60 of the mold 50. After cooled, molten plastic congeals into the basis 31 of the fan seat 30 and the tubal portion 32 of the basis 31 integrates with the bearing set 34. The flanges 33 formed on opposite ends of the tubal portion 32 is then able to grip opposite ends of the tube 36 at the same time. The fan seat 30 is thus formed. The upper part 52 of the mold 50 is then detached from the lower part 54 to allow the fan seat 30 to be taken off the lower part 54.

Figure 3:
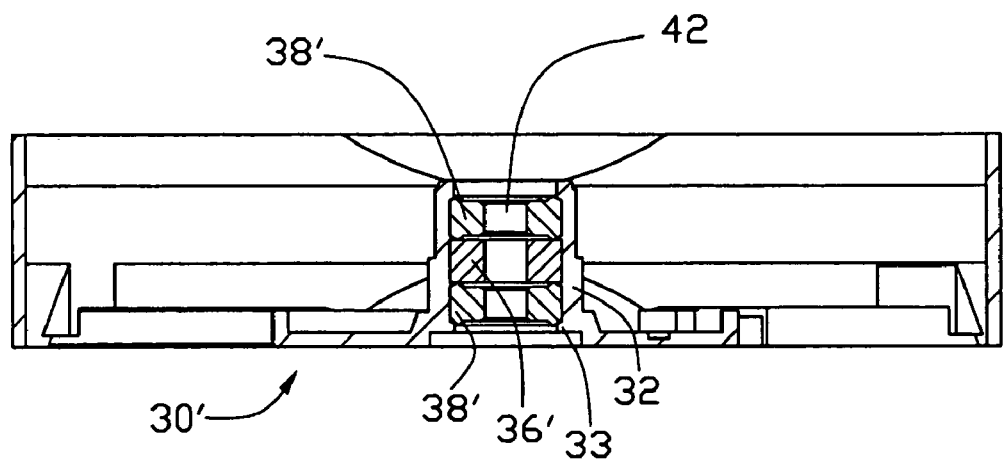
FIG. 3 is a cross section view of a fan seat in accordance with an alternative embodiment of the present invention.
Figure 4:
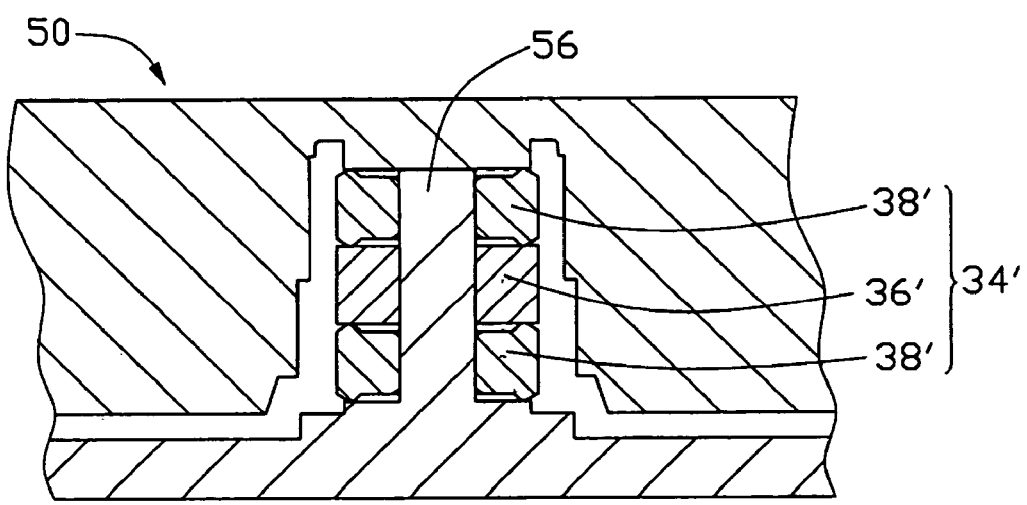
FIG. 4 is a cross section view of a part of a mold used in a method for producing the fan seat of FIG. 3, together with a bearing set of the fan seat of FIG. 3.
Figure 5:
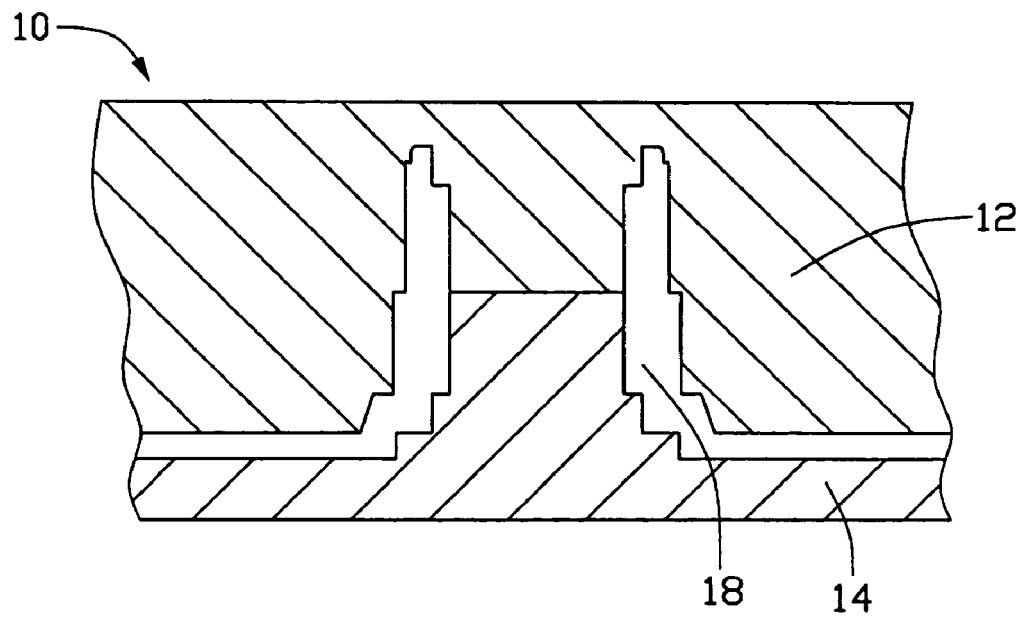
FIG. 5 is a cross section view of a part of a mold used in a conventional method for producing fan seats.
Figure 6:
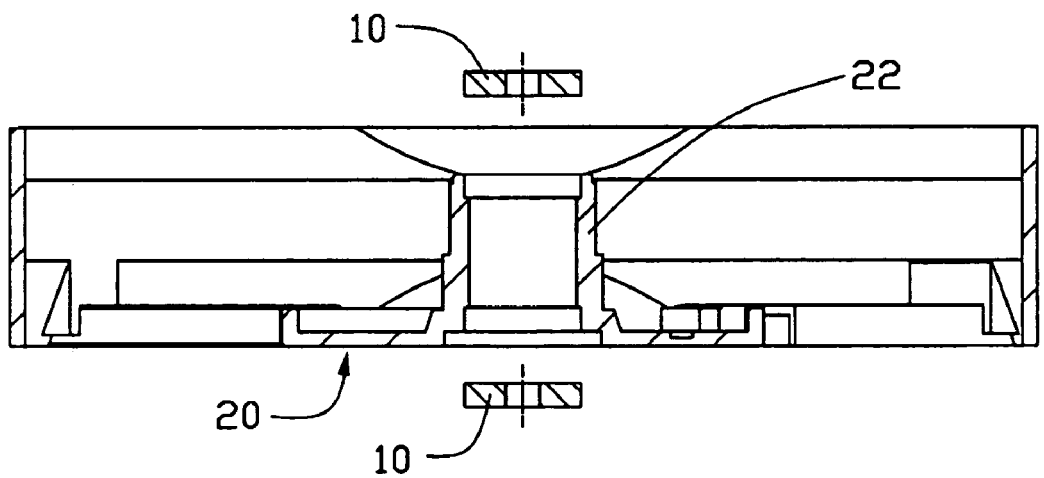
FIG. 6 is a cross section view of a fan seat produced by the convention method described in FIG. 5.

FIGS. 3–4 show a fan seat 30' in accordance with an alternative embodiment of the present invention and the mold 50 for producing it. The fan seat 30' is similar to the fan seat 30 of the preferred embodiment except the bearing set 34' thereof. The bearing set 34' comprises a pair of bearings 38' and a spacing column 36' located between the bearings 38'. The bearings 38' and the spacing column 36' commonly define an axial hole 56. The bearing set 34' is located in the tubal portion 32 of the fan seat 30' and sandwiched between the pair of flanges 33. The bearings 38' are made of nano ceramic material. The spacing column 36' is made of metal material such as: copper. Alternatively, the spacing column 36' is a metal oil-bearing. In producing, the bearings 38' and the spacing column 36' are sequentially attached to the post 56 of the mold 50. The remaining process is the same with that of the preferred embodiment.

In the preferred embodiment of the present invention, the pair of bearings 38 is secured to the tube 36 in advance before the insert-molding process. The tubal portion 32 of the fan seat 30 is then successfully molded and formed in the mold 50 by surrounding and integrating directly with the tube 36 in which the bearings 38 have been secured. In the alternative embodiment of the present invention, the bearings 38' are attached to the post 56 in advance before the insert-molding process. Therefore, any slightly deformation of the tubal portion 32 during the cooling process will not affect coaxial extent of the separate bearings 38, 38' since the metal tube 36 and the bearings 38, 38' have a good rigidity comparing to the plastic tubal portion 32.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A method for producing a fan seat having a tubal portion in which a bearing set is installed, the method comprising steps of:
providing a mold with a cavity; locating the bearing set in the cavity with a space formed between the bearing set and the mold corresponding to the tubal portion;
injecting molten material into the space; and
cooling the molten material, whereby the molten material congeals into the tubal portion and integrates with the bearing set.

2. The method as claimed in claim 1, wherein the tubal portion comprises a pair of flanges integrally formed on opposite ends of an inner circumferential surface thereof and the bearing set is sandwiched between the flanges.

3. The method as claimed in claim 2, wherein the bearing set comprises a tube and a pair of bearings secured in opposite end portions of the tube before the bearing set is located in the cavity.

4. The method as claimed in claim 3, wherein the tube and the bearing are made of different material.

5. The method as claimed in claim 4, wherein the bearings are made of nano ceramic material and the tube is made of metal.

6. The method as claimed in claim 5, wherein the tube comprises a shoulder formed in an inner circumferential surface thereof for spacing the bearings.

7. The method as claimed in claim 2, wherein the bearing set comprises a pair of bearings and a spacing column located between the bearings, the bearings and the spacing column being made of different material.

8. The method as claimed in claim 2, wherein the mold comprises an upper part and a lower part, a post extending from one of the upper and lower parts for locating the bearing set in the cavity of the mold.

9. The method as claimed in claim 8, wherein said one of the upper and lower parts comprises a stand adjacent the post, and an outer diameter of the stand is smaller than an outer diameter of the tubal portion so that one of the flanges can be formed at one end of the tubal portion.

10. The method as claimed in claim 9, wherein a block extends from the other one of the upper and lower parts and contacts a distal end of the post in the step of injecting molten material into the space, and an outer diameter of the block is smaller than an outer diameter of the tubal portion so that the other one of the flanges can be formed at an opposite end of the tubal portion.

11. A fan seat comprising:
a basis comprising a tubal portion having a pair of flanges with an inner diameter smaller than the tubal portion integrally formed on opposite ends of an inner circumferential surface thereof; and
a bearing set located in the tubal portion and sandwiched between the flanges,
wherein the bearing set comprises a tube and a bearing installed in the tube, the tube and the bearing being made of different material; and
wherein the tube is made of metal material and the bearing is made of ceramic material.

12. The fan seat as claimed in claim 11, wherein the bearing is made of nano ceramic material.

13. The fan seat as claimed in claim 12, wherein the bearing is sleeve bearing.

14. The fan seat as claimed in claim 12, further comprising another bearing firmly secured in the tube spacing from said the bearing.

15. A fan seat comprising:
a basis comprising a tubal portion having a pair of flanges with an inner diameter smaller than the tubal portion integrally formed art opposite ends of an inner circumferential surface thereof; and
a bearing set located in the tubal portion and sandwiched between the flanges, wherein the bearing set comprises a pair of bearings and a spacing column located between the bearings, the bearings and the spacing column being made of different material; and wherein the bearings are made of nano ceramic material, and the spacing column is a metal oil-bearing.

* * * * *